(12) United States Patent
Matsuno

(10) Patent No.: US 10,224,560 B2
(45) Date of Patent: Mar. 5, 2019

(54) FUEL CELL SYSTEM, AND FUEL CELL MODULE

(71) Applicant: TOSHIBA FUEL CELL POWER SYSTEMS CORPORATION, Yokohama-shi (JP)

(72) Inventor: Takeshi Matsuno, Yokohama (JP)

(73) Assignee: TOSHIBA FUEL CELL POWER SYSTEMS CORPORATION, Yokohama-shi (JP)

( * ) Notice: Subject to any disclaimer, the term of this patent is extended or adjusted under 35 U.S.C. 154(b) by 89 days.

(21) Appl. No.: 15/448,073

(22) Filed: Mar. 2, 2017

(65) Prior Publication Data

US 2017/0256807 A1 Sep. 7, 2017

(30) Foreign Application Priority Data

Mar. 3, 2016 (JP) ................. 2016-041081

(51) Int. Cl.
*H01M 8/06* (2016.01)
*H01M 8/0612* (2016.01)
(Continued)

(52) U.S. Cl.
CPC ............. *H01M 8/0618* (2013.01); *C01B 3/38* (2013.01); *H01M 8/04022* (2013.01);
(Continued)

(58) Field of Classification Search
CPC ........... H01M 8/0618; H01M 8/04302; H01M 8/04022; H01M 8/04425; H01M 8/04373; H01M 8/04753; H01M 8/04776; H01M 2008/1293; C01B 3/38; C01B 2203/0233; C01B 2203/066; C01B 2203/0811; C01B 2203/0822; C01B 2203/1276; C01B 2203/1294

See application file for complete search history.

(56) References Cited

U.S. PATENT DOCUMENTS

2001/0016275 A1  8/2001  Takamura
2004/0105794 A1  6/2004  Maenishi et al.
(Continued)

FOREIGN PATENT DOCUMENTS

JP  2004-149407 A   5/2004
JP  2010-251309     11/2010
(Continued)

OTHER PUBLICATIONS

Extended European Search Report dated Sep. 20, 2017 in Patent Application No. 17158758.7.
(Continued)

*Primary Examiner* — Raymond Alejandro
(74) *Attorney, Agent, or Firm* — Oblon, McClelland, Maier & Neustadt, L.L.P.

(57) ABSTRACT

A fuel cell system according to the present invention includes a cell stack, a combustion part, a reformed water carburetor, a gas mixer, and a reformer. The cell stack is a cell stack that is configured by stacking fuel cells and generates electric power by using hydrogen-containing gas and oxygen-containing gas. The combustion part burns the hydrogen-containing gas and the oxygen-containing gas that have not been consumed in the cell stack. A reformed water carburetor is communicated with the combustion part via an exhaust gas passage and generates steam. The gas mixer, placed on the top of the combustion part. The reformer, placed on the top of the combustion part in contact with the gas mixer, is a reformer, generates the hydrogen-containing gas by reforming the mixed gas, and supplies the hydrogen-containing gas to the cell stack via the hydrogen gas passage.

14 Claims, 9 Drawing Sheets

(51) Int. Cl.
*H01M 8/04014* (2016.01)
*H01M 8/0432* (2016.01)
*H01M 8/0438* (2016.01)
*H01M 8/04746* (2016.01)
*H01M 8/04302* (2016.01)
*C01B 3/38* (2006.01)
*H01M 8/124* (2016.01)

(52) U.S. Cl.
CPC ... *H01M 8/04302* (2016.02); *H01M 8/04373* (2013.01); *H01M 8/04425* (2013.01); *H01M 8/04753* (2013.01); *H01M 8/04776* (2013.01); *C01B 2203/0233* (2013.01); *C01B 2203/066* (2013.01); *C01B 2203/0811* (2013.01); *C01B 2203/0822* (2013.01); *C01B 2203/1276* (2013.01); *C01B 2203/1294* (2013.01); *H01M 2008/1293* (2013.01)

(56) References Cited

U.S. PATENT DOCUMENTS

| | | | |
|---|---|---|---|
| 2004/0229092 A1* | 11/2004 | Take | H01M 8/04089 429/411 |
| 2008/0253944 A1 | 10/2008 | Whyatt et al. | |
| 2008/0280171 A1 | 11/2008 | Maenishi et al. | |
| 2014/0099561 A1 | 4/2014 | Yokoyama et al. | |
| 2014/0295303 A1 | 10/2014 | Matsuo et al. | |
| 2015/0030943 A1* | 1/2015 | Kobayashi | C01B 3/38 429/410 |
| 2015/0311553 A1* | 10/2015 | Dohkoshi | H01M 8/0631 429/410 |
| 2016/0372772 A1 | 12/2016 | Hirakawa | |

FOREIGN PATENT DOCUMENTS

| | | | | |
|---|---|---|---|---|
| JP | 2011-119055 | * | 6/2011 | H01M 8/04 |
| JP | 2012-94417 A | | 5/2012 | |
| JP | 2014-32801 A | | 2/2014 | |
| JP | 2014-194855 A | | 10/2014 | |
| JP | 2015-204172 A | | 11/2015 | |
| WO | WO 2015/002182 A1 | | 1/2015 | |

OTHER PUBLICATIONS

Extended European Search Report dated May 11, 2017 in Patent Application No. 17158758.7.

* cited by examiner

FUEL CELL SYSTEM, AND FUEL CELL MODULE

CROSS REFERENCE TO RELATED APPLICATIONS

This application is based upon and claims the benefit of priority from the prior Japanese Patent Application No. 2016-041081, filed on Mar. 3, 2016, the entire contents of which are incorporated herein by reference.

FIELD

The present invention relates to a fuel cell system and a fuel cell module.

BACKGROUND

As a next-generation power generation system, there is known a fuel cell module that generates electricity using hydrogen-containing gas and oxygen-containing gas. This fuel cell module houses a fuel cell in a container thereof. In addition, as the temperature in the fuel cell is raised, cell voltage per current density increases. Due to this, power generation efficiency of the fuel cell becomes high. On the other hand, if the temperature of the fuel cell becomes too high, durability becomes low. For this reason, it is necessary to maintain the fuel cell within an appropriate temperature range.

In addition, hydrogen-containing gas to be supplied to the fuel cell is generated in a reformer. The reformer uses heat of exhaust gas generated by combustion of the gas that has not been consumed in the fuel cell.

In other words, in the reformer, hydrocarbon such as methane ($CH_4$), which is a raw fuel, and steam are caused to react by the steam reforming process using heat of exhaust gas. This reaction generates hydrogen and carbon monoxide (CO). On the other hand, as the combustion heat quantity of exhaust gas becomes low, the temperature of the reformer becomes low. Due to this, the quantity of methane or the like that is not reformed by the reformer increases. The unreformed methane causes a reforming reaction that is associated with heat absorption in the fuel cell and reduces power generation efficiency.

Furthermore, in the steam reforming process, carbon is deposited when the amount of steam becomes less than double the amount of carbon of methane or the like by mole ratio. This carbon deposition is referred to as carbon coking. If carbon coking is generated, the amount of hydrogen and carbon monoxide to be supplied to the fuel cell is reduced, and thus power generation efficiency may be reduced and the fuel cell may be degraded. For this reason, it is necessary to supply in a stable manner the amount of steam that is equal to or greater than double the amount of fuel carbon by mole ratio.

The problem to be solved by the present invention is to provide a fuel cell system that is capable of improving power generation efficiency.

DETAILED DESCRIPTION

Embodiments will now be explained with reference to the accompanying drawings.

A fuel cell system according to the present invention includes a cell stack, a combustion part, a reformed water carburetor, a gas mixer, and a reformer. The cell stack is a cell stack that is configured by stacking fuel cells and generates electric power by using hydrogen-containing gas that is supplied via a hydrogen gas passage and oxygen-containing gas that is supplied via an air preheat passage.

The combustion part burns the hydrogen-containing gas and the oxygen-containing gas that have not been consumed in the cell stack. A reformed water carburetor is communicated with the combustion part via an exhaust gas passage and generates steam using supplied water by heat exchange with gas supplied through the exhaust gas passage. The gas mixer, placed on the top of the combustion part, is a gas mixer that is communicated with the reformed water carburetor via a reformed steam pipe and generates mixed gas in which the steam supplied through the reformed steam pipe and the fuel gas supplied via a fuel gas passage are mixed. The reformer, placed on the top of the combustion part in contact with the gas mixer, is a reformer that is communicated with the gas mixer, generates the hydrogen-containing gas by reforming the mixed gas, and supplies the hydrogen-containing gas to the cell stack via the hydrogen gas passage.

Embodiments will now be explained with reference to the accompanying drawings.

First Embodiment

A fuel cell system according to the first embodiment is to combine a reformer with a gas mixer in a shape with the same size as the size of a cell stack and thus to combust more efficiently the oxygen-containing gas and the hydrogen-containing gas that have not been consumed in the cell stack.

(Structure)

Figure 1:
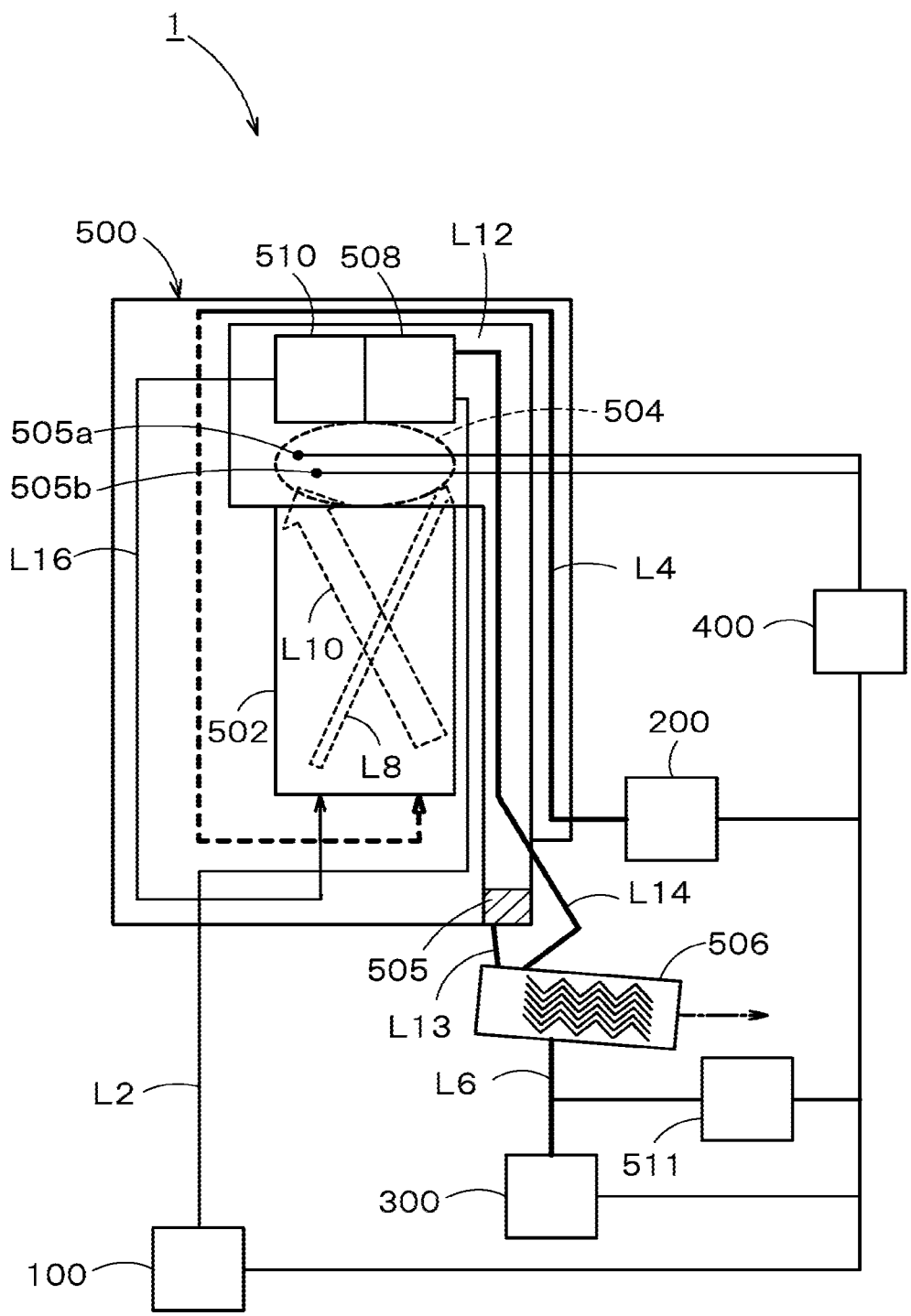
FIG. 1 is a schematic view that illustrates a structure of a fuel cell system according to a first embodiment.

FIG. 1 is a schematic view that illustrates a structure of a fuel cell system 1 according to the first embodiment. The fuel cell system 1 generates power using hydrogen-containing gas and oxygen-containing gas that have been generated by reforming a hydrocarbon fuel. More specifically, the fuel cell system 1 is configured including a fuel gas supply unit 100, an oxygen-containing gas supply unit 200, a reformed water supply unit 300, a control unit 400, and a fuel cell module 500.

The fuel gas supply unit 100 supplies fuel gas to the fuel cell module 500 via a fuel gas passage L2. As the fuel gas, for example, hydrocarbon such as city gas or CNG whose feedstock is natural gas, liquefied petroleum gas LPG, or the like is used as the main component. Composition of CNG is, for instance, methane 88%, C2H6 ethane 7%, C3H8 propane 4%, and C4H10 butane 1%.

The oxygen-containing gas supply unit 200 supplies oxygen-containing gas to the fuel cell module 500 via an air preheat passage L4. As the oxygen-containing gas, for example, air is used.

The reformed water supply unit 300 supplies reformed water to the fuel cell module 500 via a reformed water pipe L6. Reformed water is changed into steam and used to generate reformed gas together with fuel gas. In addition, the reformed gas is a hydrogen-containing gas whose main component is hydrogen.

The control unit 400 controls the fuel gas supply unit 100, the oxygen-containing gas supply unit 200, and the reformed water supply unit 300. The control unit 400 is configured with, for instance, a CPU.

The fuel cell module 500 generates power using hydrogen-containing gas and oxygen-containing gas. The fuel cell module 500 is configured including a cell stack 502, a combustion chamber 504, a catalystic burner 505, a reformed water carburetor 506, a gas mixer 508, and a reformer 510 in a container thereof.

The cell stack 502 is configured by stacking a plurality of fuel cells, for example, solid oxide fuel cells that include gas passages L8 and L10. Each of the fuel cells is electrically connected. The fuel cell has a fuel electrode and an oxidant electrode. Then, the fuel cell generates power by the reaction presented by the chemical formula 1. The hydrogen-containing gas flows through the gas passage L8 on a fuel electrode side and causes a fuel electrode reaction. The oxygen-containing gas flows through the gas passage L10 on an oxidant electrode side and causes an oxidant electrode reaction.

Fuel electrode reaction: $H_2+O^{2-} \rightarrow 2H^+ +2e-$ $CO+O^{2-} \rightarrow CO_2+2e-$ Oxidant electrode reaction: $O_2+4e- \rightarrow 2O^{2-}$ [Chemical Formula 1]

The hydrogen-containing gas that has not been consumed in the cell stack 502 is emitted from the gas passage L8 on the fuel electrode side to the combustion chamber 504. On the other hand, the oxygen-containing gas that has not been consumed in the cell stack 502 is emitted from the gas passage L10 on an oxidant electrode side to the combustion chamber 504.

The combustion chamber 504 combusts the hydrogen-containing gas and the oxygen-containing gas that have not been consumed in the cell stack 502 and emits exhaust gas. The combustion chamber 504 refers to a space between the cell stack 502 and the gas mixer 508 and the reformer 510. In this case, the combustion chamber 504 may include a configuration member that configures the combustion chamber 504. Alternatively, the combustion chamber 504 may not include a configuration member that configures the combustion chamber 504. It is to be noted that a thermocouple 505a of a combustion chamber 1 and a thermocouple 505b of a combustion chamber 2 are provided in a vicinity of upstream and in a vicinity of outlet of the reformer 510.

An exhaust gas passage L12 makes the combustion chamber 504 and the reformed water carburetor 506 in communication with each other. The exhaust gas passage L12 is made up mainly with a plate and supplies the reformed water carburetor 506 with exhaust gas after combusted in the combustion chamber 504.

The catalystic burner 505 is provided at the end of the exhaust gas passage L12. The catalystic burner 505 combusts unburnt gas in exhaust gas. In addition, a gap between the catalystic burner 505 and the exhaust gas passage L12 is sealed with a paper-like thermal insulation material, a blanket-like thermal insulation material, or the like so that the exhaust gas fully passes through the catalystic burner 505.

The exhaust gas that has passed through the catalystic burner 505 is supplied to the reformed water carburetor 506 via an exhaust gas passage L13. The exhaust gas passage L13 is in communication with the exhaust gas passage L12 and is in a tube-like shape. The exhaust gas passage L13 has an opening at the bottom of the catalystic burner 505 and penetrates a plate part on which the catalystic burner 505 is provided. The penetration part is sealed by welding so that exhaust gas in the exhaust gas passage L13 and oxygen-containing gas in the air preheat passage L4 are not mixed. In this manner, the exhaust gas passages L12 and L13 pass by a side of the cell stack 502, penetrate the plate part on which the catalystic burner 505 is provided, and communicate with the reformed water carburetor 506.

The air preheat passage L4 is in communication with the oxygen-containing gas supply unit 200 and the gas passage L10 on the oxidant electrode side in the cell stack 502. The air preheat passage L4 is made up mainly with a plate and feeds air that has been supplied from the oxygen-containing gas supply unit 200 to the cell stack 502.

The air preheat passage L4 and the exhaust gas passage L12 are welded so that exhaust gas and oxygen-containing gas are not mixed. Furthermore, while the air preheat passage L4 and the exhaust gas passage L12 perform heat exchange in the part indicated with the solid line in a flow of air, the air preheat passage L4 and the exhaust gas passage L12 do not perform heat exchange in the part indicated with the dotted line in a flow of air. In other words, the dotted line indicated in the air preheat passage L4 indicates a flow of oxygen-containing gas with which heat exchange is not performed with the exhaust gas passage L12. On the other hand, in the fuel cell module 500, temperature becomes, for instance, equal to or higher than 100° C. during normal operation. For this reason, oxygen-containing gas is preheated also when the oxygen-containing gas passes through in the air preheat passage L4 indicated with the dotted line. In this manner, the air preheat passage L4 extends from the bottom to the top of the side of the fuel cell module 500, passes by the top of the cell stack 502, extends from the side to the bottom of the cell stack 502, and communicates with the gas passage L10 on the oxidant electrode side at the bottom face of the cell stack 502.

The reformed water carburetor 506 is in communication with the combustion chamber 504 via the exhaust gas passages L12 and L13 as mentioned above and supplied with heat of exhaust gas. The reformed water carburetor 506 performs heat exchange with water supplied from the reformed water supply unit 300 and generates steam by pool boiling. For example, the reformed water carburetor 506 is a fin-plate heat exchanger in which a passage is press molded. In addition, the reformed water carburetor 506 is provided at a tilt by about 10° horizontally. Hence, reformed water supplied via the reformed water pipe L6 gathers vertically downwards the reformed water carburetor 506 due to gravity.

On the other hand, the generated steam gathers an outlet part of the reformed water carburetor 506. In other words, the generated steam gathers at a position in which a reformed steam pipe L14 is communicated with the reformed water carburetor 506. This increases a discharge efficiency and suppresses a bumping phenomenon.

In addition, the amount of generated steam is adjusted in accordance with the amount of the reformed water that is supplied to the reformed water carburetor 506. For instance, reformed water is supplied to the reformed water carburetor 506 so that the mole ratio S/C between the number of moles (C) of the amount of carbon and the number of moles (S) of the amount of steam of the fuel becomes 2.5.

The reformed steam pipe L14 makes the reformed water carburetor 506 and the gas mixer 508 in communication with each other. The reformed steam pipe L14 supplies the gas mixer 508 with steam supplied from the reformed water carburetor 506. In other words, the reformed steam pipe L14 extends in the exhaust gas passage L12 from the side of the gas mixer 508, which is the downstream side of the reformer 510, to further downstream, penetrates the plate that makes up the exhaust gas passage L12, and communicates with the reformed water carburetor 506. In addition, the reformed steam pipe L14 is sealed by welding with the plate that makes up the exhaust gas passage L12. This causes the reformed steam pipe L14 to receive heat by heat conduction from the plate that makes up the exhaust gas passage L12 and the exhaust gas. This heat conduction is capable of applying heat to the steam in the reformed steam pipe L14. It is to be noted that a plate that makes up the air preheat passage L4 and the reformed steam pipe L14 are not in contact with each other.

When pressure in the reformed water carburetor 506 is reduced, bumping occurs and the proportion of the amount of steam as a fuel is reduced. This causes carbon coking to be generated. For this reason, in order to increase steam pressure loss in the reformed steam pipe L14, the equivalent diameter of the reformed steam pipe L14 is made smaller than the equivalent diameter of each of the gas mixer 508 and the reformed water carburetor 506. For example, the equivalent diameter of the reformed steam pipe L14 is approximately 1.7 mm and pipe-like.

The gas mixer 508 mixes steam supplied from the reformed water carburetor 506 with fuel gas supplied from the fuel gas supply unit 100. In other words, the gas mixer 508 generates mixed gas in which the supplied steam and the supplied fuel gas are mixed. In addition, the gas mixer 508 is filled with an alumina ball of 3 mm in diameter for instance. This alumina ball is used to facilitate mixture of the fuel gas and the steam. In a state where the inside of the gas mixer 508 and the inside of the reformer 510 are empty, the equivalent diameter of the gas mixer 508 and that of the reformer 510 are identical. This equivalent diameter is, for example, approximately 23 mm. In addition, it is configured so that the equivalent diameter of the gas mixer 508 and that of the reformer 510 are sufficiently greater than the equivalent diameter of the steam pipe even if the alumina ball and the reforming catalyst are filled in the gas mixer 508 and the reformer 510, respectively.

Here, the equivalent diameter is a representative length that indicates how long the diameter of an equivalent circular pipe is in terms of flow. The equivalent diameter is calculated by the formula of De=4Af/Wp. Here, Af denotes a cross-sectional area of the passage and Wp denotes a length of an wetted perimeter, that is, a length of a wall face on the cross section. It is to be noted that the gas mixer 508 is supplied mainly with steam from the reformed steam pipe L14. On the other hand, if the reformed water carburetor 506 is in a low temperature state, there is a possibility that liquid water is supplied to the reformed steam pipe L14.

The reformer 510 is in communication with the gas mixer 508 and is supplied with mixed gas, that is, steam and fuel gas, from the gas mixer 508. The reformer 510 generates reformed gas, which is hydrogen-containing gas, using steam and methane, which is a fuel gas. For instance, the reformer 510 generates reformed gas by the steam reforming process.

A hydrogen gas passage L16 is in communication with the reformer 510 and the gas passage L10 on the oxidant electrode side in the cell stack 502. The hydrogen gas passage L16 extends from the side of the reformer 510 to the bottom of the cell stack 502 and is in communication with the gas passage L8. As known from this, the reformed gas generated in the reformer 510 is supplied to the gas passage L8 on the fuel electrode side in the cell stack 502 via the hydrogen gas passage L16.

In addition, the reformer 510 includes therein, as a reforming catalyst, a catalyst in which noble metal such as ruthenium (Ru) and platinum (Pt) or base metal such as nickel (Ni) and iron (Fe) is supported in a porous carrier of alumina or the like for example.

Furthermore, a stainless-steel member excellent in high-temperature endurance is used to configure the reformer 510. For instance, alumina former NCA-1 or NSSC21M is used as the configuration member. The alumina former NCA-1 or NSSC21M is a ferritic stainless steel that has a coefficient of thermal expansion that is close to that of the cell and a small Cr volatilization volume.

It is configured so that the size of the bottom face of the reformer 510 and the gas mixer 508 combined together becomes similar to the size of the top face of the cell stack 502. In other words, it is configured so that the horizontal cross section in a state where the gas mixer 508 and the reformer 510 are combined together becomes similar to the horizontal cross section of the cell stack 502. In addition, the bottom face of a shape of the reformer 510 and the gas mixer 508 combined together is configured to be planar without a gap between the reformer 510 and the gas mixer 508.

In general, inside of the cell stack 502 reacts at equal to or higher than 500° C., reformulation of the reformer 510 reacts at equal to or higher than 300° C., and evaporation of reformed water in the reformed water carburetor 506 reacts at equal to or higher than 100° C. As know from this, inside of the reformed water carburetor 506 reacts at equal to or higher than 100° C. On the other hand, inside of the fuel cell and inside of the reformer 510 react at a temperature equal to or higher than that of the reformed water carburetor 506. A reformed water inlet pressure gauge 511 measures pressure at an inlet part of the reformed water carburetor 506.

It is to be noted that in the fuel cell module 500, a thermal insulation material is filled in a space except the cell stack 502, the combustion chamber 504, the gas mixer 508, the reformer 510, and each of the passages. In addition, the combustion chamber 504 in the present embodiment corresponds to the combustion part in which the hydrogen-containing gas and the oxygen-containing gas that have not been consumed in the cell stack 502 burn. It is to be noted that although it is not shown in the figures, the outer circumference of the fuel cell module 500 including the reformed water carburetor 506 is covered with a thermal insulation material so as to keep the heat. It is to be noted that in the present embodiment, the reformed water inlet pressure gauge 511 is unnecessary. It is provided just to measure a pressure fluctuation range to be written in Table 1.

(Operation)

An explanation will be made on a normal operation of the fuel cell system 1. At first, the reformed water supply unit 300 supplies reformed water to the reformed water carburetor 506. Subsequently, the reformed water carburetor 506 generates steam using supplied reformed water by heat exchange with exhaust gas supplied via the exhaust gas passage L12. The steam passes through the reformed steam pipe L14 and is supplied to the gas mixer 508. In this case, the reformed steam pipe L14 performs heat exchange with exhaust gas in the exhaust gas passage L12 and the plate that makes up the exhaust gas passage L12. This causes the steam in the reformed steam pipe L14 to be supplied to the gas mixer 508 while heat is applied to the steam.

On the other hand, the fuel gas supply unit 100 supplies CNG, of which the main component is methane gas, to the gas mixer 508 as a fuel gas. Subsequently, the gas mixer 508 mixes steam supplied from the reformed water carburetor 506 with fuel gas supplied from the fuel gas supply unit 100. Then, the gas mixer 508 supplies the reformer 510 with the steam and the fuel gas that have been mixed. At this time, heat is applied to the gas mixer 508 and the reformer 510 due to combustion of exhaust gas. Subsequently, the reformer 510 generates reformed gas, which is hydrogen-containing gas, by the steam reforming process using steam and fuel gas.

Next, the hydrogen-containing gas is supplied to the gas passage L8 on the fuel electrode side in the cell stack 502 via the hydrogen gas passage L16. On the other hand, the oxygen-containing gas supplied from the oxygen-containing gas supply unit 200 is supplied to the gas passage L8 on the fuel electrode side in the cell stack 502 while being preheated by performing heat exchange in the air preheat passage L4 and the exhaust gas passage L12.

The reformed exhaust gas emitted from the gas passage L8 on the fuel electrode side and the air exhaust gas emitted from the gas passage L10 on the oxidant electrode side are mixed and combusted in the combustion chamber 504. Subsequently, the exhaust gas that has generated by the combustion is supplied to the reformed water carburetor 506 via the exhaust gas passage L12. The processing operation like this is carried out in a normal operation of the fuel cell system 1.

Next, an explanation will be made on a combustion efficiency of exhaust gas. When an open space is generated on the top of the combustion chamber 504, an airflow is generated in which the hydrogen-containing gas and the oxygen-containing gas that have not been consumed in the cell stack 502 concentrate in the open space. Such an airflow reduces combustion efficiency of the hydrogen-containing gas and the oxygen-containing gas that have not been consumed.

In contrast, the fuel cell system 1 according to the present embodiment is configured so that the size of the bottom face of the reformer 510 and the gas mixer 508 combined together becomes similar to the size covering the top face of the cell stack 502. In other words, the area and the shape of the horizontal cross section of the cell stack 502 and the area and the shape of the horizontal cross section in a state where the reformer 510 and the gas mixer 508 are combined together are configured to be similar. It is to be noted that those areas and shapes may be a size and a shape with which mixture of the hydrogen-containing gas with the oxygen-containing gas is facilitated, and may not be similar.

Due to this, in a gap formed between an outlet part of the cell stack 502 and the bottom face of the reformer 510 and the gas mixer 508, mixture is facilitated by hindering the flow of the air exhaust gas and the reformed exhaust gas and thus combustion is facilitated more. For example, in comparison with a conventional configuration example in which the reformed steam pipe L14 with the equivalent diameter smaller than that of the gas mixer 508 is placed on the top of the combustion chamber 504, mixture of the air exhaust gas and the reformed exhaust gas is facilitated and the combustion efficiency becomes better. In other words, the reformed steam pipe L14 is provided in the exhaust gas passage L12 along the exhaust gas passage L12 from the side of the gas mixer 508, which is downstream of the reformer 510. This increases the combustion efficiency.

In addition, the bottom face in a state where the reformer 510 and the gas mixer 508 are combined together is configured to planar without a gap between the reformer 510 and the gas mixer 508. This suppresses generation of an airflow that hinders facilitation of mixture.

Furthermore, unless the temperature of the reformer 510 rises to, for instance, equal to or higher than 300° C., a component with carbon atom of 2(C2) or higher such as propane and ethane is not reformed and the component of C2 or higher is supplied to the fuel cell. In this manner, if the efficiency of reforming is reduced, the component with carbon atom of 2(C2) or higher is supplied to the fuel cell. Due to this, carbon coking is generated in the fuel cell, resulting in reduction in power generation efficiency and degradation of the fuel cell.

On the other hand, in the fuel cell system 1 according to the present embodiment, the reformed water carburetor 506, which generates steam, is not placed on the top of the combustion chamber 504. This enables exhaust gas that is higher in temperature to be intensively used for reforming gas. Hence, exhaust gas that is higher in temperature is intensively supplied to the reformer 510 and the gas mixer 508, and the temperature of the reformer 510 and the gas mixer 508 rises more. It is to be noted that if the reformed water carburetor 506, which generates steam, is placed on the top of the combustion chamber 504, heat of the exhaust gas is lost to the heat of evaporation of water and temperature rise of the fuel cell may be suppressed. If the cell temperature is low, cell voltage in the identical current density becomes low and the power generation efficiency is reduced.

In addition, the gas mixer 508 is configured to have the equivalent diameter that is larger than that of the reformed steam pipe L14. For this reason, due to a synergy effect with high temperature caused by exhaust gas, mixture of the fuel gas with the steam can be carried out more efficiently.

As known from these, the reforming efficiency in the reformer 510 increases and emission of the component with carbon atom of 2(C2) or higher is reduced. For this reason, the proportion of the reforming reaction at the fuel cell is further reduced and the temperature in the fuel cell further rises. This causes the power generation efficiency to be kept in a high state.

Next, an explanation will be made on suppression of bumping in the reformed water carburetor 506. If the heat quantity of the reformed steam pipe L14 is lost, pressure in the reformed steam pipe L14 is reduced and bumping occurs by pool boiling in reformed water carburetor 506.

In the light of this, in the fuel cell system 1 according to the present embodiment, the reformed steam pipe L14 passes through in the exhaust gas passage L12 and is placed by wiring to a position in which the reformed steam pipe L14 penetrates the catalystic burner 505. Due to this, the steam in the reformed steam pipe L14 is heated by heat exchange with exhaust gas as the steam proceeds in the reformed steam pipe L14. In this case, pressure loss, which is a flow resistance of the steam, in the reformed steam pipe L14 is kept and reduction of pressure in the reformed water carburetor 506 is avoided. For this reason, occurrence of bumping in the reformed water carburetor 506 is suppressed. Moreover, temperature of the reformer 510 to which steam that has been heated by exhaust gas is supplied and temperature of the combustion chamber 504, which is adjacent to the reformer 510, rise and power generation efficiency can be raised.

In addition, in order to suppress bumping, the equivalent diameter of the reformed steam pipe L14 is configured to be smaller than that of the gas mixer 508 and the reformed water carburetor 506. This enables pressure loss, which is a flow resistance of the steam, to further increase and bumping in the reformed water carburetor 506 to be further suppressed. For this reason, fluctuation of the steam generation amount can be suppressed and the steam can be supplied to the gas mixer 508 and the reformer 510 in a stable manner. In this case, since the gas mixer 508 is larger than the reformed steam pipe L14 in terms of the equivalent diameter, the gas mixer 508 acts as a buffer element. As known from these, in the reformer 510, steam is supplied in a more stable manner, occurrence of carbon coking in the reformer 510 and the cell stack 502 is suppressed, and power generation efficiency further increases.

(Advantageous Effects)

Table 1 presents an example of an experiment result in each embodiment.

reformed steam pipe L14 and avoids reduction of pressure in the reformed water carburetor 506. Hence, the steam is supplied to the reformer 510 in a stable manner and occurrence of carbon coking in the reformer 510 and the cell stack 502 can be suppressed.

Second Embodiment

A fuel cell system according to the second embodiment is to cause a reformed steam pipe to pass through also in an air preheat passage so as to apply more heat to the steam in the reformed steam pipe.

(Structure)

Figure 2:
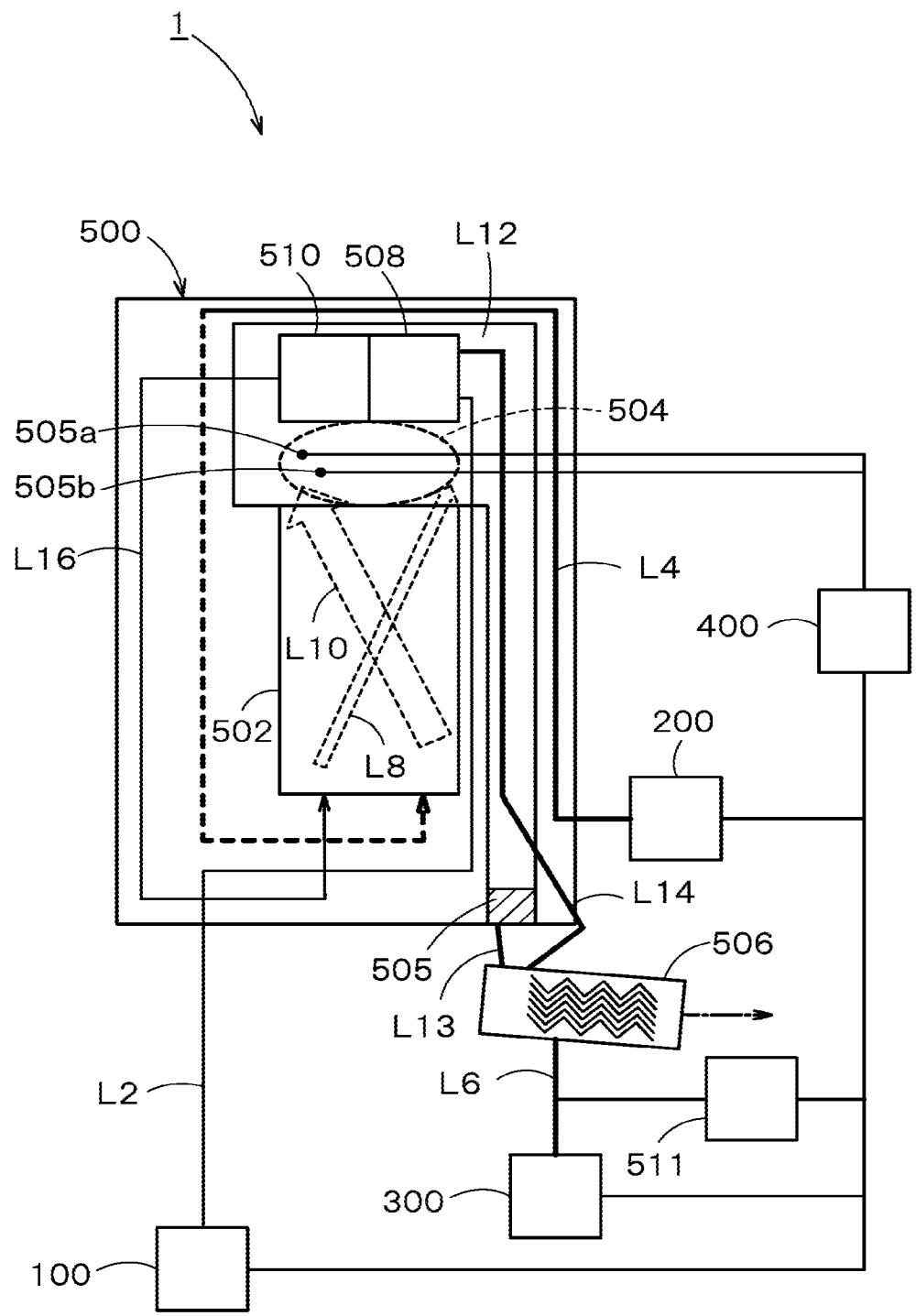
FIG. 2 is a schematic view that illustrates a structure of a fuel cell system according to a second embodiment.

FIG. 2 is a configuration view of the fuel cell system 1 according to the second embodiment. The fuel cell system 1 according to the second embodiment is different from the fuel cell system 1 according to the first embodiment in that the reformed steam pipe L14 passes through also in the air preheat passage L4. The parts that are identical to those of the fuel cell system 1 according to the first embodiment are designated by the identical reference numerals and redundant description will be curtailed.

TABLE 1

| | COMBUSTION CHAMBER 1 | COMBUSTION CHAMBER 2 | PRESSURE FLUCTUATION RANGE | DC POWER GENERATION EFFICIENCY | REFORMER OUTLET TEMPERATURE | CELL MAXIMUM TEMPERATURE |
|---|---|---|---|---|---|---|
| FIRST EMBODIMENT | 762° C. | 721° C. | 8% | 58.51% | 631° C. | 758° C. |
| SECOND EMBODIMENT | 762° C. | 731° C. | 2% | 58.32% | 681° C. | 769° C. |
| THIRD EMBODIMENT | 718° C. | 728° C. | 25% | 58.56% | 600° C. | 745° C. |
| FOURTH EMBODIMENT | 755° C. | 745° C. | 3% | 58.80% | 632° C. | 773° C. |

In this Table 1, the combustion chambers 1 and 2 indicate temperatures of two places of the combustion chamber 504. In addition, the pressure fluctuation range indicates the fluctuation range of the reformed water inlet pressure in the gas mixer 508 and DC power generation efficiency indicates the power generation efficiency of the fuel cell system 1 in the same conditions (fuel gas flow amount, air flow amount, reformed water amount, cell current density, and settling time). Furthermore, a reformer outlet temperature indicates the outlet temperature of the reformer 510 and a cell maximum temperature indicates the maximum temperature in the cell stack 502.

As presented in Table 1, the fluctuation range of the reformed water inlet pressure is 8%. In addition, since the reformed water is supplied with S/C2.5, reformed water with S/C2.0 or greater is constantly supplied to the reformer 510. This causes carbon coking to be suppressed.

According to the present embodiment, the reformer 510 and the mixer 508 are combined in a shape with the same size as the size of the cell stack 502. This facilitates combustion of the oxygen-containing gas and the hydrogen-containing gas that have not been consumed and improves the power generation efficiency of the fuel cell system 1. In addition, the equivalent diameter of the reformed steam pipe L14 is configured to be smaller than that of the gas mixer 508 and the reformed water carburetor 506 and the placement distance of the reformed steam pipe L14 in the exhaust gas passage L12 is configured to be long. This keeps the pressure loss, which is a flow resistance of the steam, in the The reformed steam pipe L14 penetrates the plate that makes up the air preheat passage L4. This reformed steam pipe L14 is sealed by welding with the plate that makes up the air preheat passage L4.

(Operation)

This air preheat passage L4 is made higher in temperature by oxygen-containing gas with which heat exchange has been performed with exhaust gas. For this reason, the steam in the reformed steam pipe L14 is heated by heat conduction of the high-temperature plate in the air preheat passage L4 and heat transfer of the high-temperature oxygen-containing gas.

(Advantageous Effects)

As presented in Table 1, temperature of the combustion chamber 504, which is adjacent to the reformer 510, can be raised higher than that in the fuel cell system 1 according to the first embodiment. This enables temperature of the cell stack 502, which is adjacent to the combustion chamber 504, can also be raised higher than the cell stack 502 of the first embodiment. As known from this, since the temperature of the combustion chamber 504 gets higher and combustion can be maintained even if the fuel is reduced, the power generation efficiency can be raised higher.

According to the present embodiment, the reformed steam pipe L14 is configured to pass through also in the air preheat passage L4. Due to this, the steam in the reformed steam pipe L14 can be heated more by heat exchange of the plate of the air preheat passage L4 with the oxygen-containing gas in the air preheat passage L4. For this reason, the steam to be supplied to the gas mixer 508 can be heated more and the power generation efficiency can be raised.

Third Embodiment

A fuel cell system according to the third embodiment is to use a shell and tube type heat exchanger as a reformed water carburetor so as to cause a temperature adaptability of the reformed water carburetor to be improved.

(Structure)

It is different from the fuel cell system 1 according to the second embodiment in that in place of a fin-plate heat exchanger, a shell and tube type heat exchanger is used for the reformed water carburetor 506 presented in FIG. 2. Since the configuration is the same as that of the fuel cell system 1 according to the second embodiment presented in FIG. 2, the description will be curtailed.

A shell and tube type heat exchanger has a shape in which a multitude of tubes are housed in a shell.

This shell and tube type heat exchanger is adaptive to a wide range of environments from low temperature to high temperature and low pressure to high pressure.

(Operation)

The shell and tube type heat exchanger can suppress reduction of the heat exchange efficiency even if the reformed water carburetor 506 is low in temperature. For this reason, the shell and tube type heat exchanger can suppress reduction of the heat exchange efficiency even when the fuel cell system 1 is started up and the like.

(Advantageous Effects)

Although the shell and tube type heat exchanger is inferior to the fin-plate type in terms of the heat exchange amount at the time of normal operation, the heat exchange efficiency at the time of low temperature. As presented in Table 1, the reformed water is S/C2.5. For this reason, since the reformed water with S/C2.0 or greater is constantly supplied to the reformer 510, carbon coking is does not occur.

According to the present embodiment, the shell and tube type heat exchanger is configured to be used as the reformed water carburetor 506. This can improve the temperature adaptability of the reformed water carburetor 506.

Fourth Embodiment

A fuel cell system according to the fourth embodiment is to make the distance in which the reformed steam pipe comes out to a space outside the fuel cell module shorter than the distance in which the exhaust gas passage comes out to a space outside the fuel cell module, so as to further increase the heat utilization efficiency of the fuel cell system as a whole.

(Structure)

Figure 3:
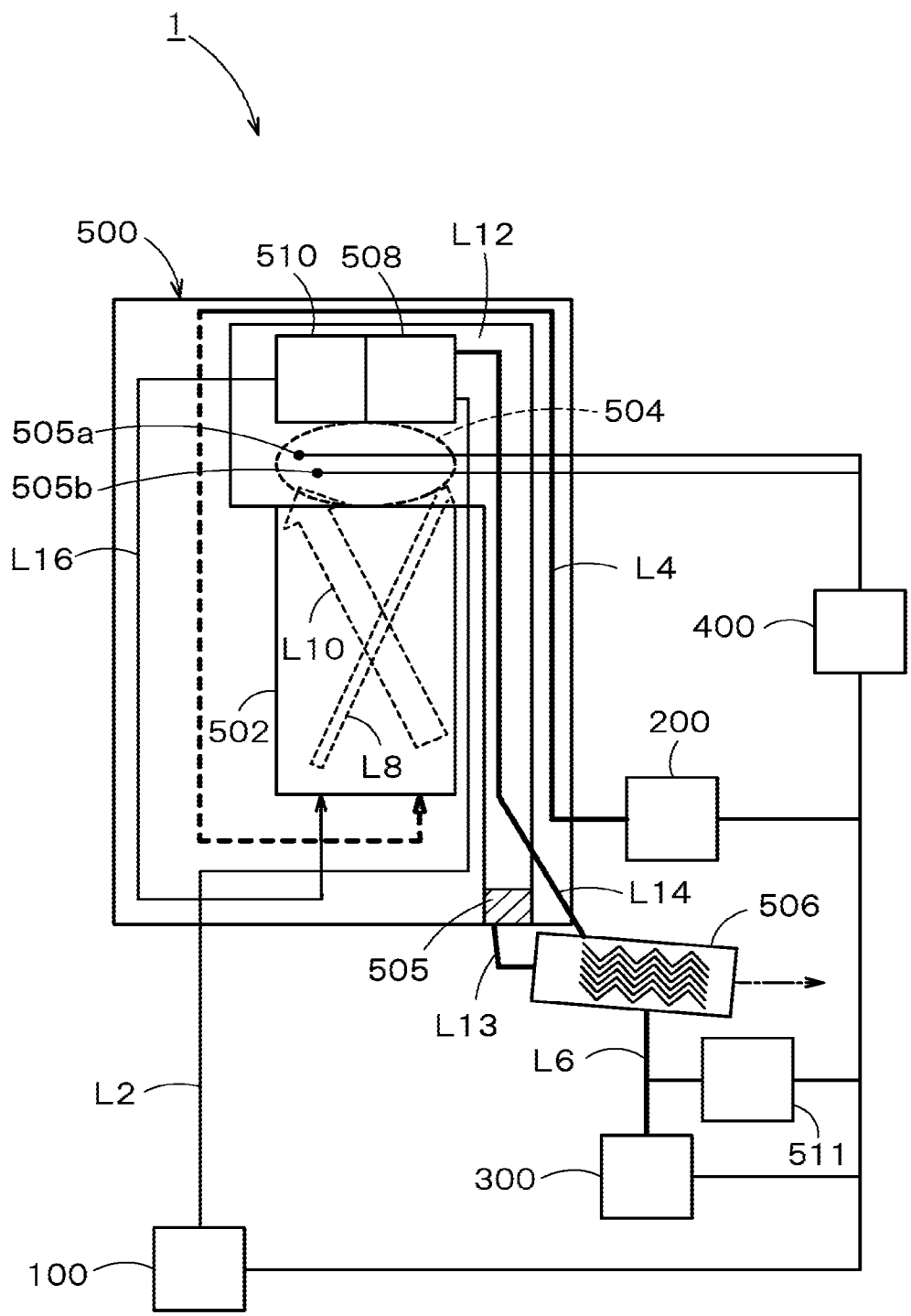
FIG. 3 is a schematic view that illustrates a structure of a fuel cell system according to a fourth embodiment.

FIG. 3 is a configuration view of the fuel cell system 1 according to the fourth embodiment. It is different from the fuel cell system 1 according to the second embodiment in that the distance in which the reformed steam pipe L14 comes out to a space outside the fuel cell module 500 is shorter than the distance in which the exhaust gas passage L13 comes out to a space outside the fuel cell module 500. The parts that are identical to those of the fuel cell system 1 according to the second embodiment are designated by the identical reference numerals and redundant description will be curtailed.

The length of the reformed steam pipe L14 from the reformed water outlet of the reformed water carburetor 506 to the point in which the reformed steam pipe L14 penetrates the plate that makes up the exhaust gas passage L12 is configured to be shorter than the length of the exhaust gas passage L13 from the catalystic burner 505 to the exhaust gas inlet of the reformed water carburetor 506. In other words, the reformed water carburetor 506 is placed in a position where the length of the reformed steam pipe L14 from the reformed water outlet to the point in which the reformed steam pipe L14 penetrates the plate that makes up the exhaust gas passage L12 becomes shorter than the length of the exhaust gas passage L13 from the catalystic burner 505 to the exhaust gas inlet of the reformed water carburetor 506. For this reason, the connection of the reformed water carburetor 506 is changed from flange connection to welding.

(Operation)

Since the steam, which condenses at 100° C., flows through in the reformed steam pipe L14, there is a release of latent heat. On the other hand, there is a release of sensible heat in the exhaust gas passage L12. A release of sensible heat has less heat loss than that in a release of latent heat. For this reason, since the distance in which the reformed steam pipe L14 is exposed to an ordinary temperature is made shorter, the heat loss of the fuel cell system 1 as a whole.

(Advantageous Effects)

As presented in Table 1, an average temperature becomes higher than that of the second embodiment, and the temperature of the cell stack 502, which is adjacent to the combustion chamber 504, also rises. This raises the power generation efficiency than that of the second embodiment.

The fuel cell system 1 according to the present embodiment is configured so that the distance in which the reformed steam pipe L14 comes out to a space outside the fuel cell module 500 is shorter than the distance in which the exhaust gas passage L12 comes out to a space outside the fuel cell module 500. This can increase the heat utilization efficiency of the fuel cell system 1 as a whole.

Fifth Embodiment

A fuel cell system according to the fifth embodiment is to provide an exhaust gas heater in the exhaust gas passage so as to cause the reformed water carburetor to vaporize water also at the time of starting up the fuel cell system.

(Structure)

Figure 4:
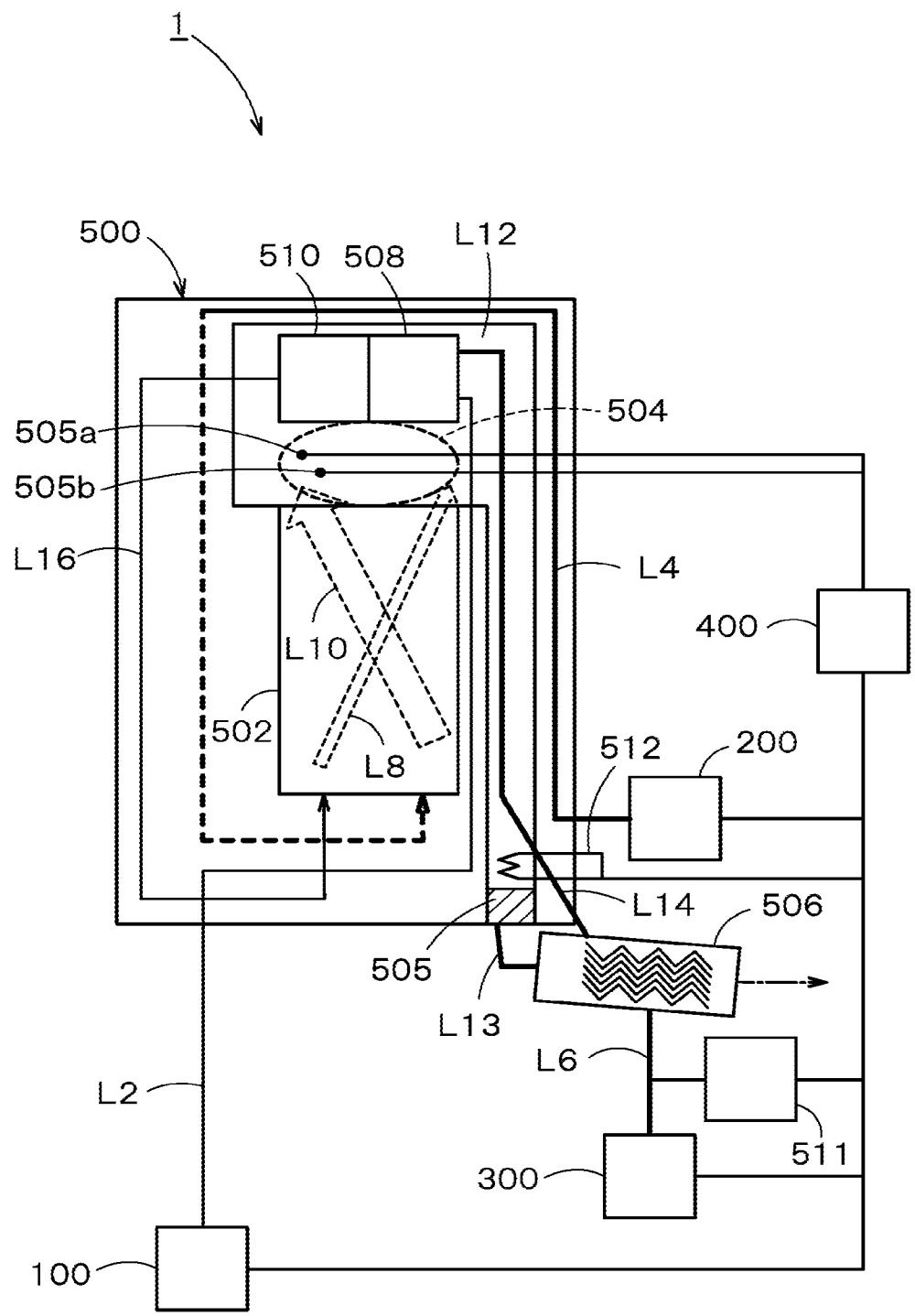
FIG. 4 is a schematic view that illustrates a structure of a fuel cell system according to a fifth embodiment.

FIG. 4 is a configuration view of the fuel cell system 1 according to the fifth embodiment. It is different from the fuel cell system 1 according to the fourth embodiment in that an exhaust gas heater 512 is further included. The parts that are identical to those of the fuel cell system 1 according to the fourth embodiment are designated by the identical reference numerals and redundant description will be curtailed.

The exhaust gas heater 512, provided in a downstream of the exhaust gas flow of the gas mixer 508 of the exhaust gas passage L12, applies heat to the exhaust gas. In addition, it is more preferable that the exhaust gas heater 512 is provided in the vicinity of the most downstream of the exhaust gas passage L12 close to the reformed water carburetor 506. In this case, heat release loss is prevented and the exhaust gas that flown into the reformed water carburetor 506 can be heated in a more efficient manner. It is to be noted that the position where the exhaust gas heater 512 is provided is not limited to the vicinity of the most downstream, and the exhaust gas heater 512 may be provided at any position in the exhaust gas passage L12.

(Operation)

An explanation will be given on an operation at the time of starting up the fuel cell system 1. The control unit 400 starts driving the exhaust gas heater as well as starting supplying oxygen-containing gas from the oxygen-containing gas supply unit 200. Subsequently, the control unit 400 causes the reformed water carburetor 506 to supply exhaust gas that has been heated by the exhaust gas heater 512 for a certain period of time. In this case, since the cell stack 502 has not been supplied with hydrogen-containing gas, the exhaust gas is mainly oxygen-containing gas.

Next, the control unit 400 causes the reformed water supply unit 300 to supply water to the reformed water carburetor 506. Then, the operation of the startup is terminated.

In this manner, the control unit 400 starts supplying water to the reformed water carburetor 506 when the reformed water carburetor 506 becomes ready to vaporize water. Due to this, the water supplied to the reformed water carburetor 506 is supplied to the gas mixer 508 after being vaporized, that is, as steam. For this reason, the pressure loss in the reformed steam pipe L14 becomes greater, and pulsation caused by bumping in the reformed water carburetor 506 can be suppressed. As known from this, vaporized water, that is, steam can be supplied to the reformer 510 in a stable manner without pulsation even at the time of starting up, when the fuel cell module 500 is relatively low in temperature.

(Advantageous Effects)

The fuel cell system 1 according to the present embodiment is to provide the exhaust gas heater 512 in the exhaust gas passage L12 so as to cause inside of the reformed water carburetor 506 to be ready to vaporize water also at the time of starting up the fuel cell system 1. Due to this, vaporized water, that is, steam can be supplied to the reformer 510 in a stable manner without pulsation even at the time of starting up, when the fuel cell module 500 is relatively low in temperature. For this reason, occurrence of carbon coking can be suppressed in the reformer 510 and the fuel cell stack and the reformer 510 and the fuel cell can be prevented from being degraded.

Sixth Embodiment

A fuel cell system according to the sixth embodiment is to provide an exhaust gas thermometer in the exhaust gas passage so as to cause the reformed water carburetor to be supplied with reformed water at the timing in which it is ready to vaporize the water.

(Structure)

Figure 5:
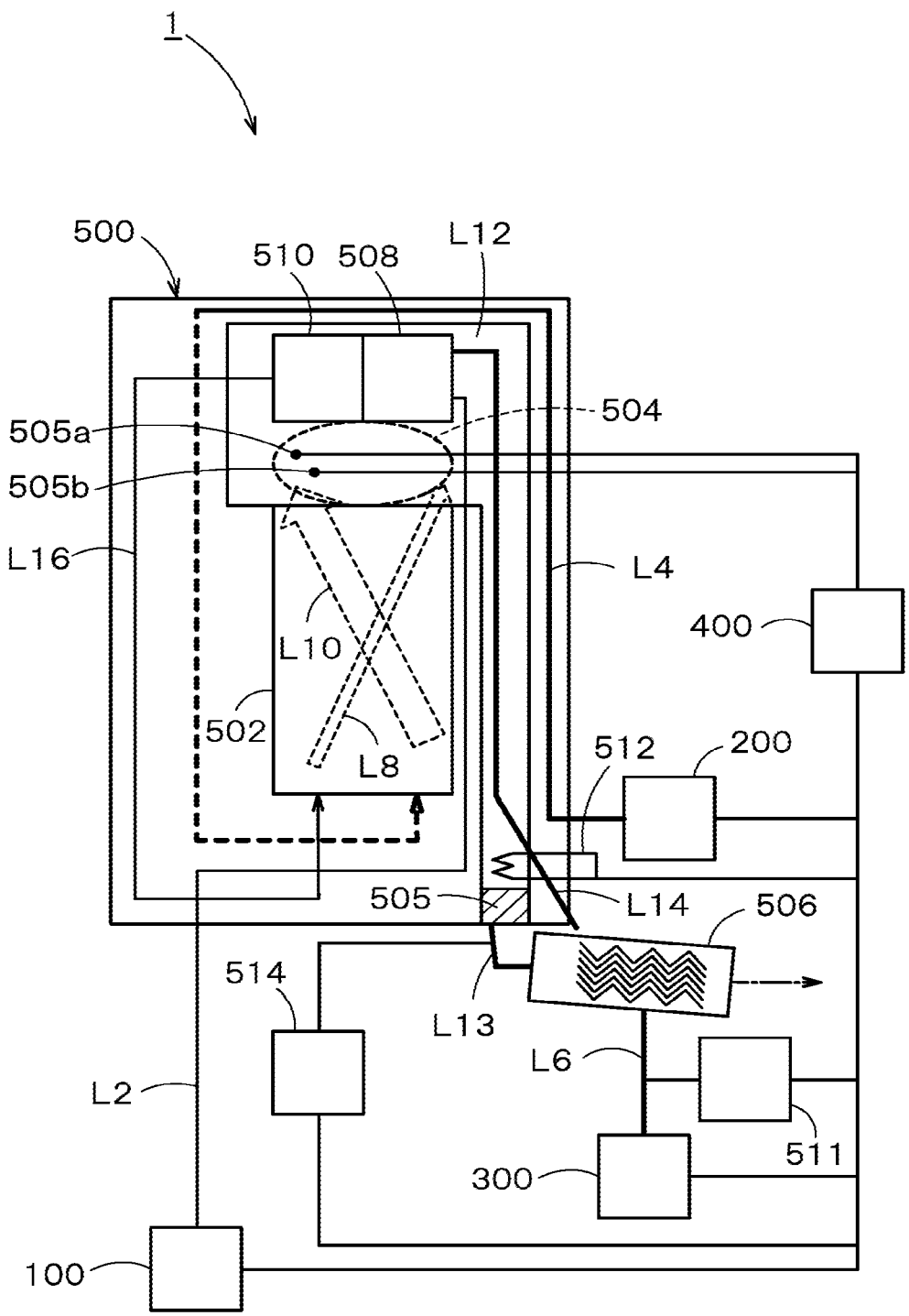
FIG. 5 is a schematic view that illustrates a structure of a fuel cell system according to a sixth embodiment.

FIG. 5 is a configuration view of the fuel cell system 1 according to the sixth embodiment. It is different from the fuel cell system 1 according to the fifth embodiment in that an exhaust gas thermometer 514 is provided in the exhaust gas passage L12. The parts that are identical to those of the fuel cell system 1 according to the fifth embodiment are designated by the identical reference numerals and redundant description will be curtailed. It is to be noted that the exhaust gas thermometer 514 may be provided on a wall surface of the exhaust gas passage rather than in the exhaust gas passage.

The exhaust gas thermometer 514 is provided in a downstream more than the exhaust gas heater 512 in the exhaust gas passage L12. The exhaust gas thermometer 514 measures temperature of the exhaust gas. It is to be noted that since the exhaust gas thermometer 514 is used, the reformed water inlet pressure gauge 511 is unnecessary.

(Operation)

An explanation will be given on an operation at the time of starting up the fuel cell system 1. The control unit 400 starts driving the exhaust gas heater 512 as well as causing the oxygen-containing gas supply unit 200 to start supplying oxygen-containing gas. Subsequently, the control unit 400 causes the reformed water carburetor 506 to supply exhaust gas that has been heated by the exhaust gas heater 512 for a certain period of time. Subsequently, the control unit 400 determines whether the measurement value of the exhaust gas thermometer 514 has become 100° C. or higher. If less than 100° C., the control unit 400 continues the drive of the exhaust gas heater 512 and the supply of the oxygen-containing gas in a state where the supply of water to the reformed water carburetor 506 is stopped.

On the other hand, if the measurement value of the exhaust gas thermometer 514 has become 100° C. or higher, the control unit 400 causes the reformed water supply unit 300 to start supplying water to the reformed water carburetor 5065. Then, the operation of the startup is terminated.

In this manner, supply of water to the reformed water carburetor 506 is started after the exhaust gas becomes 100° C. or higher. Due to this, the water supplied to the reformed water carburetor 506 is vaporized and supplied to the gas mixer 508 as steam. For this reason, the pressure loss in the reformed steam pipe L14 becomes greater, and pulsation caused by bumping in the reformed water carburetor 506 can be suppressed. Due to this, vaporized water can be supplied to the reformer 510 in a stable manner without pulsation even at the time of starting up, when the fuel cell module 500 is relatively low in temperature. It is to be noted that while in the present embodiment, the condition of the exhaust gas temperature is 100° C. or higher, the exhaust gas temperature may be any degree as long as under the condition where water is vaporized in the reformed water carburetor 506.

(Advantageous Effects)

The fuel cell system 1 according to the present embodiment is to provide the exhaust gas thermometer 514 in the exhaust gas passage L12 so as to cause the reformed water carburetor 506 to be supplied with reformed water at the timing in which the exhaust gas temperature becomes a predetermined value. This enables timing of supply of reformed water to be controlled in a more accurate manner. For this reason, water can be supplied to the reformed water carburetor 506 that becomes in a state where vaporization of water is possible even if the ambient temperature is changed depending on season or region. Due to this, occurrence of carbon coking can be suppressed in the reformer 510 and the fuel cell stack and the reformer 510 and the fuel cell can be prevented from being degraded.

Seventh Embodiment

A fuel cell system according to the seventh embodiment is to provide an air preheat heater in the air preheat passage and to provide an exhaust gas thermometer in the exhaust gas passage so as to cause the reformed water carburetor to be supplied with reformed water at the timing in which it is ready to vaporize the water.

(Structure)

Figure 6:
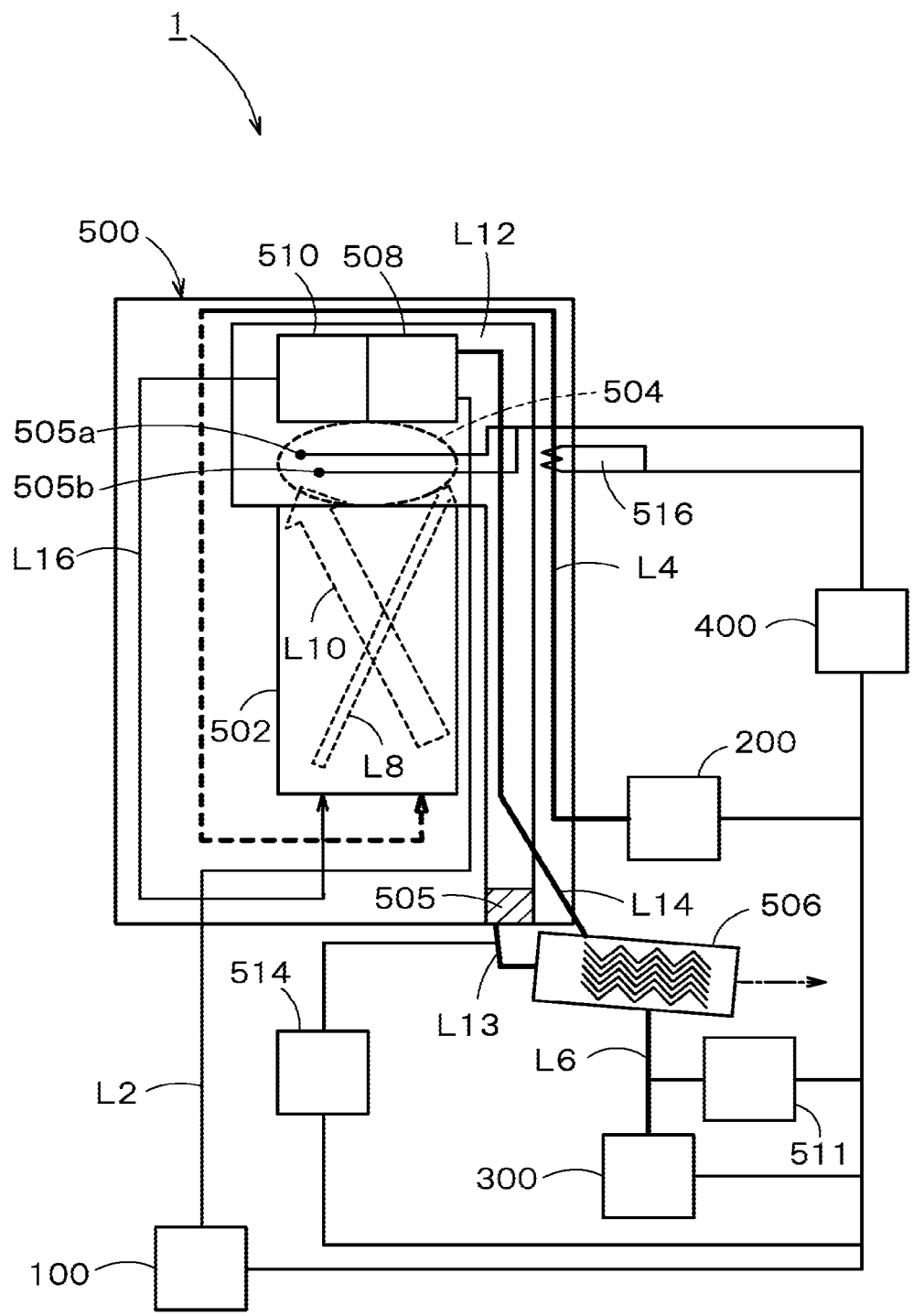
FIG. 6 is a schematic view that illustrates a structure of a fuel cell system according to a seventh embodiment.

FIG. 6 is a configuration view of the fuel cell system 1 according to the seventh embodiment. It is different from the fuel cell system 1 according to the fourth embodiment in that the exhaust gas thermometer 514 is provided in the exhaust gas passage L12 and an air preheat heater 516 is provided in the air preheat passage L4. The parts that are identical to those of the fuel cell system 1 according to the fourth embodiment are designated by the identical reference numerals and redundant description will be curtailed.

The exhaust gas thermometer 514 is provided in the exhaust gas passage L12 that is a downstream more than the exhaust gas heater 512. The exhaust gas thermometer 514 measures temperature of the exhaust gas.

The air preheat heater 516 is provided in the air preheat passage L4. This air preheat heater 516 preheats oxygen-containing gas.

(Operation)

An explanation will be given on an operation at the time of starting up the fuel cell system 1. The control unit 400 starts driving the air preheat heater 516 as well as causing the oxygen-containing gas supply unit 200 to start supplying oxygen-containing gas. Next, the control unit 400 determines whether the measurement value of the exhaust gas thermometer 514 has become 100° C. or higher. If less than 100° C., the control unit 400 continues the drive of the air preheat heater 516 and the supply of the oxygen-containing gas in a state where the supply of water to the reformed water carburetor 506 is stopped.

On the other hand, if the measurement value of the exhaust gas thermometer 514 has become 100° C. or higher, the control unit 400 causes the reformed water supply unit 300 to start supplying water to the reformed water carburetor 506. Then, the operation of the startup is terminated.

In this manner, the air preheat passage L4 is heated by the air preheat heater 516. In this case, unless the entire inside of the fuel cell module 500 becomes 100° C. or higher, the exhaust gas temperature does not become 100° C. or higher either. For this reason, supply of water to the reformed water carburetor 506 is started after the exhaust gas becomes 100° C. or higher. Due to this, the water supplied to the reformed water carburetor is vaporized and supplied to the gas mixer 508 as steam.

In addition, since the water is supplied to the gas mixer 508 as steam, the pressure loss in the reformed steam pipe L14 becomes greater, and pulsation caused by bumping in the reformed water carburetor 506 can be suppressed. For this reason, steam can be supplied to the reformer 510 in a stable manner while suppressing pulsation even at the time of starting up, when the fuel cell module 500 is relatively low in temperature. It is to be noted that while in the present embodiment, the condition of the exhaust gas temperature is 100° C. or higher, the exhaust gas temperature may be any degree as long as under the condition where water is vaporized in the reformed water carburetor 506.

(Advantageous Effects)

The fuel cell system 1 according to the present embodiment is to provide the air preheat heater 516 in the air preheat passage L4 and to provide the exhaust gas thermometer 514 in the exhaust gas passage L12 so as to cause the reformed water carburetor 506 to be supplied with reformed water at the timing in which the exhaust gas temperature becomes a predetermined value. This enables timing of supply of reformed water to be controlled in a more accurate manner. For this reason, water can be supplied to the reformed water carburetor 506 that becomes in a state where vaporization of water is possible even if the ambient temperature is changed depending on season or region. Due to this, occurrence of carbon coking can be suppressed in the reformer 510 and the fuel cell stack and the reformer 510 and the fuel cell can be prevented from being degraded. In addition, since heated oxygen-containing gas is supplied to the entire fuel cell module 500, it is possible to accelerate the starting up time until which the fuel cell becomes 500° C. or higher that enables power generation.

Eighth Embodiment

A fuel cell system according to the eighth embodiment is to provide an air preheat heater in the air preheat passage and to provide a reformed water outlet thermometer at the outlet of the reformed water carburetor so as to cause the reformed water carburetor to be supplied with reformed water at the timing in which it is ready to vaporize the water.

(Structure)

Figure 7:
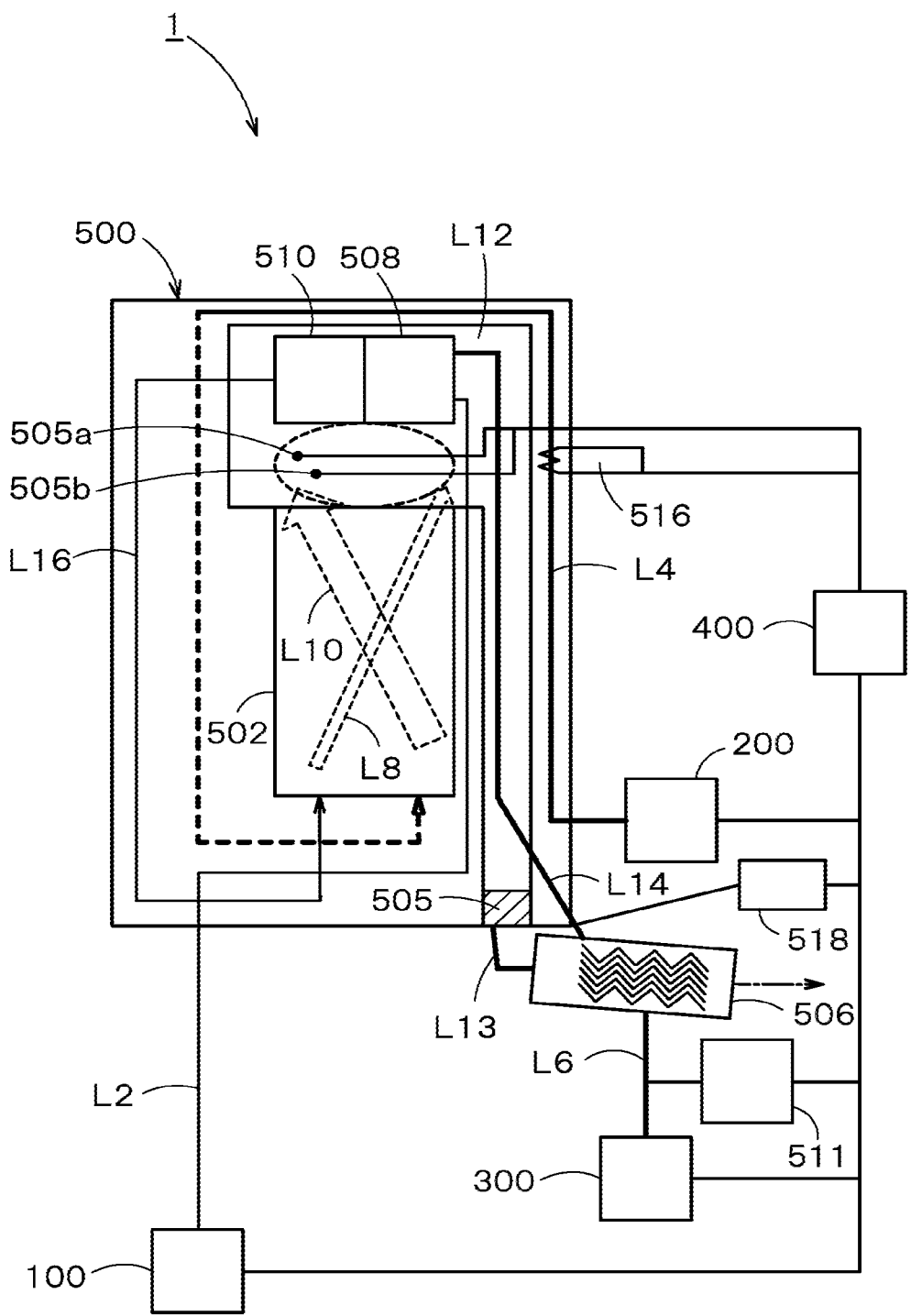
FIG. 7 is a schematic view that illustrates a structure of a fuel cell system according to an eighth embodiment.

FIG. 7 is a configuration view of the fuel cell system 1 according to the eighth embodiment. It is different from the fuel cell system 1 according to the fourth embodiment in that the air preheat heater 516 is provided in the air preheat passage L4 and a reformed water outlet thermometer 518 is provided at the outlet of the reformed water carburetor 506. The parts that are identical to those of the fuel cell system 1 according to the seventh embodiment are designated by the identical reference numerals and redundant description will be curtailed.

The air preheat heater 516 is provided in the air preheat passage L4. This air preheat heater 516 preheats oxygen-containing gas. The reformed water outlet thermometer 518 measures the temperature at the outlet of the reformed water carburetor 506. It is to be noted that the reformed water outlet thermometer 518 may not be provided in the reformed steam pipe L14 but provided on a wall surface of the reformed steam pipe L14.

(Operation)

An explanation will be given on an operation at the time of starting up the fuel cell system 1. The control unit 400 starts driving the air preheat heater 516 as well as causing the oxygen-containing gas supply unit 200 to start supplying oxygen-containing gas. Next, the control unit 400 determines whether the measurement value of the reformed water outlet thermometer 518 has become 100° C. or higher. If less than 100° C., the control unit 400 continues the supply of the exhaust gas to the reformed water carburetor 506 in a state where the supply of water to the reformed water carburetor 506 is stopped.

On the other hand, if the measurement value of the reformed water outlet thermometer 518 has become 100° C. or higher, the control unit 400 causes the reformed water supply unit 300 to start supplying water to the reformed water carburetor 506. Then, the operation of the startup is terminated.

In this manner, the air preheat heater 516 is caused to heat the air preheat passage L4. In this case, supply of water to the reformed water carburetor 506 is started after the reformed water outlet thermometer 518 becomes 100° C. or higher. Due to this, the water supplied to the reformed water carburetor 506 is supplied to the gas mixer 508 after being vaporized, that is, as steam.

In addition, since the water is supplied to the gas mixer 508 as steam, the pressure loss in the reformed steam pipe L14 becomes greater, and pulsation caused by bumping in the reformed water carburetor 506 can be suppressed. For this reason, vaporized water can be supplied to the reformer 510 in a stable manner without pulsation at the time of starting up, when the fuel cell module 500 is relatively low in temperature. It is to be noted that while in the present embodiment, the condition of the reformed water outlet temperature is 100° C. or higher, the reformed water outlet temperature may be any degree as long as under the condition where water is vaporized in the reformed water carburetor 506.

(Advantageous Effects)

The fuel cell system 1 according to the present embodiment is to provide the air preheat heater 516 in the air preheat passage L4 and to provide the reformed water outlet thermometer 518 at the outlet of the reformed water carburetor 506. This allows the reformed water carburetor 506 to be supplied with reformed water at the timing when inside the reformed water carburetor 506 becomes a predetermined temperature. For this reason, water can be supplied to the reformed water carburetor 506 that becomes in a state where vaporization of water is possible even if the ambient temperature is changed depending on season or region. Due to this, occurrence of carbon coking can be suppressed in the reformer 510 and the fuel cell stack and the reformer 510 and the fuel cell can be prevented from being degraded. In addition, it is possible to accelerate the starting up time until which the fuel cell becomes 500° C. or higher that enables power generation.

Ninth Embodiment

A fuel cell system according to the ninth embodiment is to maintain the temperature in the reformed water carburetor 506 to a predetermined temperature by adjusting the supply amount of oxygen-containing gas from the oxygen-containing gas supply unit 200 so that the pressure in at least one of the reformed steam pipe and the reformed water carburetor becomes a predetermined value or higher.

(Structure)

Figure 8:
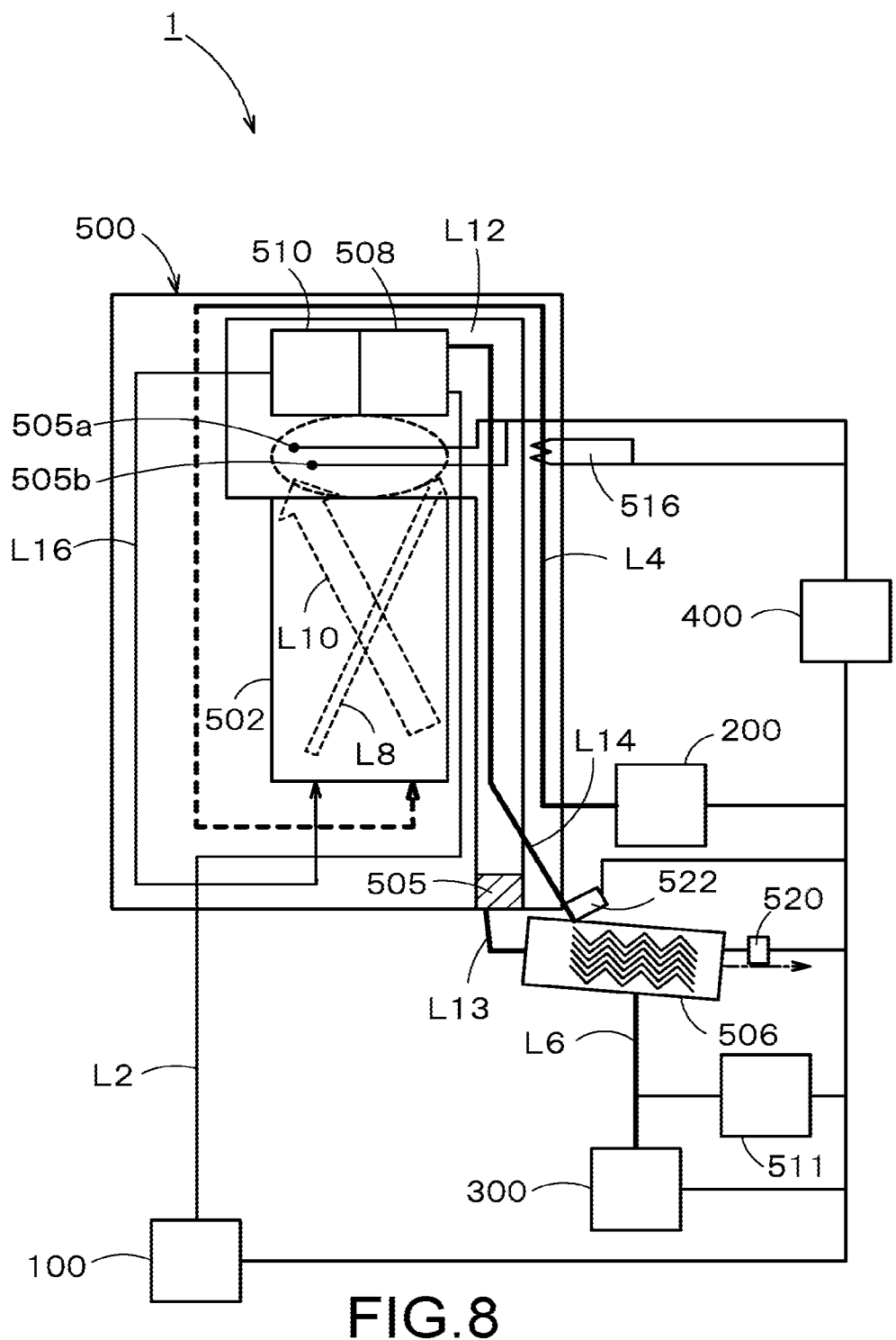
FIG. 8 is a schematic view that illustrates a structure of a fuel cell system according to a ninth embodiment.

FIG. 8 is a configuration view of the fuel cell system 1 according to the ninth embodiment. The air preheat passage L4 is provided with the air preheat heater 516. In addition, it is different from the fuel cell system 1 according to the fourth embodiment in that the reformed water inlet pressure gauge 511 is provided at the inlet of the reformed water carburetor 506, a pressure gauge 520 is provided in the reformed water carburetor 506, and a pressure gauge 522 is provided on a side wall of the reformed steam pipe L14. The parts that are identical to those of the fuel cell system 1 according to the fourth embodiment are designated by the identical reference numerals and redundant description will be curtailed.

The reformed water inlet pressure gauge 511 measures pressure at the inlet of the reformed water carburetor 506. The air preheat heater 516 is provided in the air preheat passage L4. This air preheat heater 516 preheats oxygen-containing gas. The pressure gauge 520 measures pressure in the reformed water carburetor 506. The pressure gauge 522 measures pressure in the reformed steam pipe L14. It is to be noted that any one of the pressure gauge 520, the pressure gauge 522, and the reformed water inlet pressure gauge 511 is sufficient for the present embodiment.

(Operation)

An explanation will be made on a normal operation of the fuel cell system 1. The control unit 400 maintains the supply amount of oxygen-containing gas from the oxygen-containing gas supply unit 200.

Next, it determines whether pressure at any one of the pressure gauge 520, the pressure gauge 522, and the reformed water inlet pressure gauge 511 has become a lower limit value or less. If the pressure is greater than the lower limit value, the control unit 400 maintains the supply amount of oxygen-containing gas from the oxygen-containing gas supply unit 200.

On the other hand, if the pressure has become less than the lower limit value, the control unit 400 increases the supply amount of oxygen-containing gas from the oxygen-containing gas supply unit 200. Then, the control unit 400 increases the supply amount of oxygen-containing gas from the oxygen-gen-containing gas supply unit 200 until the pressure becomes the lower limit pressure or greater.

In this manner, the control unit 400 increases the supply amount of oxygen-containing gas from the oxygen-containing gas supply unit 200 if the pressure at any one of the pressure gauge 520, the pressure gauge 522, and the reformed water inlet pressure gauge 511 has become the lower limit value or less. Due to this, the heat quantity of exhaust gas supplied to the reformed water carburetor 506 increases and the temperature of the reformed water carburetor 506 rises to a predetermined temperature. For this reason, the steam pressure each in the reformed steam pipe L14 and in the reformer 510 carburetor rises and the pulsation in the reformed steam pipe L14 can be suppressed.

(Advantageous Effects)

The fuel cell system 1 according to the present embodiment is to provide any one pressure gauge of the pressure gauge 520, the pressure gauge 522, and the reformed water inlet pressure gauge 511 so as to adjust the supply amount of oxygen-containing gas from the oxygen-containing gas supply unit 200 so that the pressure value each in the reformed steam pipe L14 and in the reformer 510 carburetor exceeds a predetermined value. This can maintain the temperature in the reformed water carburetor 506 to a predetermined temperature or higher. For this reason, the steam pressure in the reformed steam pipe L14 and in the reformer 510 carburetor rises, the pressure loss in the reformed steam pipe L14 becomes greater, and the pulsation in the reformed steam pipe L14 can be suppressed.

Tenth Embodiment

A fuel cell system according to the tenth embodiment is to maintain the temperature in the reformed water carburetor to a predetermined temperature by adjusting the supply amount of oxygen-containing gas from the oxygen-containing gas supply unit so that the temperature in the reformed steam pipe becomes a predetermined value or higher.

(Structure)

Figure 9:
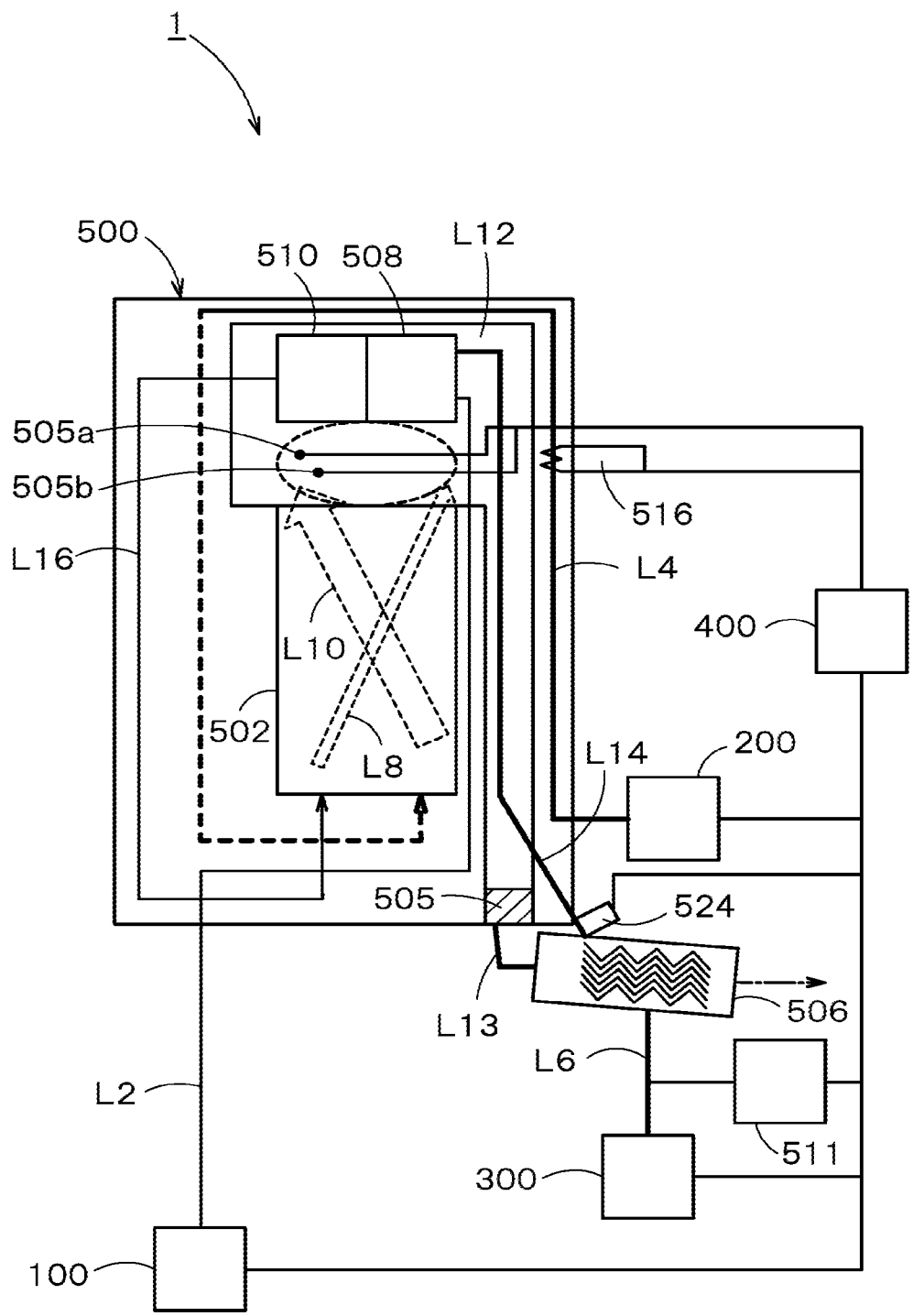
FIG. 9 is a schematic view that illustrates a structure of a fuel cell system according to a tenth embodiment.

FIG. 9 is a configuration view of the fuel cell system 1 according to the tenth embodiment. It is different from the fuel cell system 1 according to the ninth embodiment in that a thermocouple 524 is provided on a side wall of the reformed steam pipe L14. The parts that are identical to those of the fuel cell system 1 according to the ninth embodiment are designated by the identical reference numerals and redundant description will be curtailed.

The thermocouple 524 measures temperature in the reformed steam pipe L14. It is to be noted that in the present embodiment, the thermocouple 524 corresponds to the thermometer that measures the temperature in the reformed steam pipe L14. It is to be noted that the thermocouple 524 may not be provided in the reformed steam pipe L14 but provided on a wall surface of the reformed steam pipe L14. The reformed water outlet thermometer 518 may be used in place of the thermocouple 524.

(Operation)

An explanation will be made on a normal operation of the fuel cell system 1. After carrying out an equivalent processing to the step S1502, the control unit 400 determines whether the temperature in the reformed steam pipe L14 has become the lower limit value or less. If the pressure is greater than the lower limit value, the control unit 400 maintains the supply amount of oxygen-containing gas from the oxygen-containing gas supply unit 200.

On the other hand, if the pressure has become less than the lower limit value, the control unit 400 increases the supply amount of oxygen-containing gas from the oxygen-containing gas supply unit 200. Then, the control unit 400 increases the supply amount of oxygen-containing gas from the oxygen-containing gas supply unit 200 until the pressure becomes the lower limit pressure or greater.

In this manner, the control unit 400 increases the supply amount of oxygen-containing gas from the oxygen-containing gas supply unit 200 if the temperature in the reformed steam pipe L14 has become the lower limit value or less. Due to this, the heat quantity of exhaust gas supplied to the reformed water carburetor 506 increases and the temperature in the reformed steam pipe L14 rises to a predetermined temperature. For this reason, the steam pressure each in the reformed steam pipe L14 and in the reformer 510 carburetor rises and the pulsation in the reformed steam pipe L14 can be suppressed.

(Advantageous Effects)

The fuel cell system 1 according to the present embodiment is to provide the thermocouple 524 in the reformed steam pipe L14 so as to adjust the supply amount of oxygen-containing gas from the oxygen-containing gas supply unit 200 so that the temperature in the reformed steam pipe L14 exceeds a predetermined value. This can maintain the temperature in the reformed steam pipe L14 to a predetermined temperature or higher. For this reason, the steam pressure in the reformed steam pipe L14 and in the reformer 510 carburetor rises, the pressure loss in the reformed steam pipe L14 becomes greater, and the pulsation in the reformed steam pipe L14 can be suppressed.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A fuel cell system, comprising:
a cell stack comprising stacked fuel cells, wherein the cell stack generates electric power using hydrogen-containing gas supplied via a hydrogen-containing gas passage and oxygen-containing gas supplied via an air preheat passage;
a combustion part that combusts the hydrogen-containing gas and the oxygen-containing gas that have not been consumed at the cell stack;
a reformed water carburetor that is in communication with the combustion part via one or more exhaust gas passages and generates steam using water supplied by heat exchange with gas supplied through the exhaust gas passages;
a gas mixer that is provided on a top of the combustion part, is in communication with the reformed water carburetor via a reformed steam pipe, and generates mixed gas in which the steam supplied through the reformed steam pipe with fuel gas supplied via a fuel gas passage are mixed; and
a reformer that is provided on a top of the combustion part in contact with the gas mixer, is in communication with the gas mixer, generates the hydrogen-containing gas by reforming the mixed gas, and supplies the hydrogen-containing gas to the cell stack via the hydrogen-containing gas passage.

2. The fuel cell system according to claim 1, wherein the gas mixer and the reformer are combined and a horizontal cross section of a combined shape is similar to a horizontal cross section of the cell stack in terms of size.

3. The fuel cell system according to claim 2, wherein a bottom face of a shape in which the gas mixer and the reformer are combined is configured to be planar without a gap between the gas mixer and the reformer.

4. The fuel cell system according to claim 1, wherein at least part of the reformed steam pipe is provided in the exhaust gas passage.

5. The fuel cell system according to claim 1, wherein an equivalent diameter of the reformed steam pipe is smaller than an equivalent diameter of the gas mixer and the reformed water carburetor.

6. The fuel cell system according to claim 1, wherein the reformed steam pipe passes through the air preheat passage.

7. The fuel cell system according to claim 1, wherein the reformed water carburetor is provided at a tilt so that an outlet side of the steam is vertically upward.

8. The fuel cell system according to claim 1, further comprising:
a catalystic burner that is provided in a more upstream side than the reformed water carburetor in the exhaust gas passage and combusts unburnt gas in exhaust gas,
wherein a length of the reformed steam pipe from a reformed water outlet of the reformed water carburetor to a point where the reformed steam pipe penetrates the exhaust gas passage or the air preheat passage is shorter than a length of the exhaust gas passage from the catalystic burner to an exhaust gas inlet of the reformed water carburetor.

9. The fuel cell system according to claim 1, further comprising:
a heating part that heats gas supplied through the exhaust gas passage;
an oxygen-containing gas supply unit that supplies the oxygen-containing gas to the cell stack via the air preheat passage;
a water supply unit that supplies the water to the reformed water carburetor; and
a control unit that causes the oxygen-containing gas supply unit to supply the oxygen-containing gas before the combustion occurs, causes the heating part to heat, and causes the water supply unit to supply the water after entering a state in which the reformed water carburetor is ready to evaporate.

10. The fuel cell system according to claim 9, wherein the control unit carries out control of causing the water supply unit to supply the water in response to an elapse of a predetermined period of time after causing the heating part to heat.

11. The fuel cell system according to claim 9, wherein the control unit carries out control of causing the water supply unit to supply the water when the gas becomes a predetermined temperature.

12. The fuel cell system according to claim 1, further comprising:
an oxygen-containing gas supply unit that supplies the oxygen-containing gas to the cell stack via the air preheat passage;
one or more pressure gauges that measure pressure in at least any one of the reformed steam pipe and the reformed water carburetor; and
a control unit that controls an oxygen-containing gas supply unit that supplies the oxygen-containing gas based upon an output signal of the pressure gauges,
wherein the control unit causes the oxygen-containing gas supply unit to increase a supply amount of the oxygen-containing gas when a pressure indicated by the output signal becomes equal to or less than a predetermined value.

13. The fuel cell system according to claim 1, further comprising:
an oxygen-containing gas supply unit that supplies the oxygen-containing gas to the cell stack via the air preheat passage;
one or more thermometers that measure temperature in the reformed steam pipe; and
a control unit that controls an oxygen-containing gas supply unit that supplies the oxygen-containing gas based upon an output signal of the thermometers,
wherein the control unit causes an oxygen-containing gas supply unit to increase a supply amount of the oxygen-containing gas when a temperature indicated by the output signal becomes equal to or less than a predetermined value.

14. A fuel cell module, comprising:
a cell stack comprising stacked fuel cells, wherein the cell stack generates electric power using hydrogen-containing gas and oxygen-containing gas that are supplied;
a combustion part that combusts the hydrogen-containing gas and the oxygen-containing gas that have not been consumed at the cell stack;
a reformed water carburetor that is in communication with the combustion part via an exhaust gas passage and generates steam using water supplied by heat exchange with gas supplied through the exhaust gas passage;
a gas mixer that is in communication with the reformed water carburetor via a reformed steam pipe and generates mixed gas in which fuel gas that is supplied and the steam supplied through the reformed steam pipe are mixed; and
a reformer that is in communication with the gas mixer, generates the hydrogen-containing gas by reforming the mixed gas, and supplies the hydrogen-containing gas to the cell stack via the hydrogen-containing gas passage,
wherein the gas mixer and the reformer are provided in the exhaust gas passage and the reformed steam pipe is provided in the exhaust gas passage along the exhaust gas passage from the gas mixer that is downstream of the gas with respect to the reformer.

* * * * *